2,990,432
IRON OXIDE HYDRAULIC CEMENT DEHYDROGENATION CATALYST

Harold W. Fleming and William R. Gutmann, Louisville, Ky., assignors to Chemetron Corporation, Chicago, Ill., a corporation of Delaware
No Drawing. Filed June 9, 1958, Ser. No. 740,525
12 Claims. (Cl. 260—669)

This invention relates generally to the production of olefins by dehydrogenation and more specifically to the manufacture, composition and use of an improved catalyst suitable for reactions such as the production of butadiene from butylene and the production of styrene from ethyl benzene.

Considerable research has been directed in the past toward improving the production of butadiene and styrene by catalytic dehydrogenation because these products have been found to be valuable as synthetic intermediates in the production of synthetic elastomers. For example, a satisfactory rubber substitute may be produced by copolymerizing butadiene and styrene or by copolymerizing butadiene and isobutylene. Moreover, styrene may be polymerized directly to produce the familiar polystyrene synthetic resin.

The usual practice in producing butadiene is to conduct a feed gas of butylene and butane diluted with a large proportion of steam and maintained at a temperature of about 600° C. through a dehydrogenation catalyst bed. The dehydrogenation reaction proceeds more favorably under low pressure, and, accordingly, pressures ranging from slightly subatmospheric to about 10 pounds per square inch gauge have usually been utilized. Such use of relatively high temperatures and low pressures makes it necessary to employ very large reaction vessels and associated purification apparatus. Generally similar operations may be utilized in carrying out other dehydrogenation reactions such as the dehydrogenation of ethyl benzene or other alkyl-aromatics. By the term alkyl-aromatic as used here and in the claims is meant compounds of the probable formula $C_nH_{(2n+1)}$—A where "$n$" is greater than one and less than ten and "A" is an aromatic group.

There are many catalysts for the dehydrogenation reaction under the aforesaid conditions, and it has been reported that oxides of metals having atomic numbers of between 22 and 27 inclusive are satisfactory to catalyze this reaction, particularly, if promoted with an alkali compound and a difficultly reducible metal oxide such as titanium, vanadium or chromium oxide. In practice iron oxide, because of its relatively low cost has been used almost exclusively, and usually this oxide has been promoted by incorporating therewith relatively large amounts of sodium or potassium carbonate. Lithium and rubidium compounds have also been proposed as promoters, but because of their high cost have not been adopted. Potassium compounds are considered to be superior to sodium compounds as promoters and are usually preferred in spite of their somewhat higher cost. The alkali compound is believed to serve a dual function of promoting the catalytic properties of the iron oxide and also of catalyzing the reactions between the steam and undesired reaction products which would otherwise poison the catalysts. It has been found, however, that the alkali compounds have a tendency to form compounds which are volatile under reaction conditions and are lost from the catalyst. Accordingly, the commercial catalysts have employed large percentages of alkali compounds in order to offset the loss through volatilization. The use of such large percentages of alkali compounds greatly lowers the physical strength of such catalysts and makes them very hygroscopic. Moreover, as the catalysts absorb moisture they become even weaker in physical strength and may become entirely unsuitable for use. In fact, experience has shown that it is not unusual for an entire charge of catalyst (which may be around 50,000 pounds) to be completely ruined through careless handling in shipment or in charging the catalyst into the reaction vessel. This problem is so serious that the most widely used commercial catalyst of this type cannot be removed from storage containers and charged into the reactors on very humid days.

Accordingly, a very important object of this invention is to provide a physically rugged catalyst which is relatively non-hygroscopic in nature and which is not likely to be rendered unusable even though carelessly handled.

A related object is to provide a catalyst having high physical strength even after extended periods of use involving repeated regenerations so as to possess a much longer effective life than the catalysts presently in commercial use.

In producing butadiene or styrene by catalytic dehydrogenation the desired chemical reactions do not proceed to completion on a single passage through the catalyst bed, and it is customary to operate the conversion reaction within such a range that only about 20% to about 30% of the feed is converted to the desired product on each passage through the bed. Another difficulty is that catalytic reaction is not as selective as might be desired and in practice about 25% of the feed gas passing through the reaction zone is transformed into undesired reaction products. The term "selectivity" is usually utilized to define the percent of feed gas undergoing catalytic conversion which is converted to the desired product. In the production of butadiene by catalytic dehydrogenation of a butylene, butane and steam feed gas, the following are among the undesired reactions that may occur:

(1) Non-catalytic cracking of n-butenes.
(2) Non-catalytic cracking of n-butane.
(3) Non-catalytic cracking of butadiene.
(4) Non-catalytic polymerization of butadiene.
(5) Non-catalytic cracking of butadiene dimers.
(6) Catalytic cracking of butadiene.
(7) Catalytic polymerization of butadiene.
(8) Catalytic cracking of butadiene dimer.
(9) Catalytic cracking of n-butene.

(These side reactions are discussed at length in an article by L. M. Beckberger and K. M. Watson in Chemical Engineering Progress, vol. 44, No. 3, pages 229–284, March 1948.)

Accordingly, because of these numerous side reactions, it is the usual practice to fractionate the effluent stream from the catalyst bed to obtain a mixture of butylene and butane which is continuously admixed with the feed to the bed and recycled. Thus the unreacted feed gas is not lost to the process but is recovered for reuse. On the other hand, feed gas which is converted to undesirable by-products is lost to the process. Thus both the conversion value and the selectivity value are of very great importance. The product of these two values expressed in percentage is customarily referred to as "yield" while the sum of these two values is frequently referred to as "conversion selectivity value" or "CSV." Both yield and CSV have come to be used as relative standards of catalyst or operation efficiency when comparing catalysts or reaction conditions. Moreover, experience has shown that with a given catalyst when yield increases, selectivity will decrease or vice versa as the reaction conditions are altered.

Accordingly, a very significant object of this invention is to provide an improved catalyst and associated process suitable for reactions such as the production of butadiene or styrene which achieves not only a higher conversion value but also a higher selectivity value than are achievable with presently available commercial catalysts, or, expressed alternatively, which is capable of achieving higher yield and CSV than commercial catalysts heretofore available, whereby higher ultimate yields of the desired product may be obtained.

A further object is to provide a catalyst which not only has the high physical strength and ruggedness and non-hygroscopic nature as are described above but also is chemically resistant to steam, coke, and other degradation products produced in the dehydrogenation process.

It has been shown heretofore that selectivity varies with the particle or pellet size of the catalyst, the linear velocity of the hydrocarbon feed, and the temperature and pressure in the catalyst bed. It has been reported, for example, that if promoted iron oxide type catalysts are to be sufficiently selective, the internal surface area of the catalyst pellets should be less than about 8 square meters per gram. Because this effective surface area is relatively small, it is quite desirable to utilize small size catalyst pellets, in order to have relatively larger external surface areas and thereby boost the activity or conversion value of the catalyst. Small catalyst pellets charged into a bed will pack more closely and provide a greater aggregate external pellet surface than larger pellets. Experience has shown, however, that decreasing the pellet size decreases the crush strength of the pellets, and generally smaller pellets are not as durable and more likely to powder, sinter together, and be subject to channeling than larger pellets. Thus the usual commercial practice has been to utilize 3/16" diameter extrusions in the face of knowledge that 1/8" diameter or smaller extrusions, if usable would result in an increase in yield of at least about 2 or 3%.

Accordingly, it is an important object of this invention to provide a catalyst which may be made in the form of 1/8" diameter or smaller extrusions and still have sufficient mechanical strength to be rugged and have a long life.

As mentioned above good selectivity is achieved when the internal surface area of the catalyst is relatively small. Pigment grade iron oxide which is customarily used in the manufacture of dehydrogenation catalysts of this kind usually has an internal surface area of around 40 square meters per gram which has been shown to be too high for good selectivity. One method of reducing this area to the desired low range is disclosed in the Gutzeit Patent 2,408,140 and involves rigorous high temperature calcination of the formed catalyst pellets at temperatures of 800° C. to 950° C. for sufficient time (5 to 10 hours) to reduce the area to a desired low value. Another arrangement for reducing area is disclosed in the Eggertsen and Voge Patent 2,414,585 and involves precalcining the iron oxide at a temperature of 700° C. to 950° C. for a sufficient time to lower the area to below 8 square meters per gram prior to mixture of the iron oxide with the other catalyst ingredients.

We have discovered an improved and simple method of reducing the surface area to a very low value which eliminates the necessity of a precalcination step of the kind disclosed by Eggertsen and Voge and permits a much shorter and lower temperature calcination than Gutzeit's process. Thus another object of this invention is to provide a simplified and less costly process for manufacturing an alkali promoted iron oxide catalyst which does not require long time high temperature calcination.

Other objects and advantages of the catalyst and process of this invention will present themselves to those familiar with the art on reading the following detailed description and the appended claims.

It has been discovered that alkali promoted iron oxide catalysts of high physical strength and substantially non-hygroscopic properties, and which exhibit higher selectivity and conversion values than are exhibited by heretofore available commercial catalysts, can be produced by utilizing as a binding agent in the preparation of the catalyst a hydraulic cement such as Portland cement characterized by the presence of available calcium compounds. Moreover, the addition of such agents has the unexpected effect of lowering the surface area of the iron oxide quite drastically from around 40 square meters per grams to about 5 square meters. Other cements may be utilized to produce the desired higher strength qualities, but it appears from tests that if available unbound calcium compound, i.e. not chemically combined with aluminum or silicon compounds, and which is found in Portland cement after setting and calcination, is not present, an increase in selectivity and conversion value is not achieved. It is not known in what manner the unbound calcium oxide present in calcined Portland cement affects the catalytic properties of the catalysts, but it is beileved that either the calcium oxide derived from calcium sulphate (gypsum) which is incorporated into Portland cement as a retarder or other unbound calcium compounds exerts an effect upon the physical properties of the iron oxide, which physical effect substantially enhances the catalytic activity. This phenomenon will be discussed further in certain of the following specific examples.

*Example 1*

A preferred catalyst in accordance with this invention was prepared by mixing 51.2 parts by weight pigment grade alpha iron oxide ($Fe_2O_3$), 26.3 parts by weight of potassium carbonate ($K_2CO_3$), 2.5 parts by weight of chromic oxide ($Cr_2O_3$), and 20.0 parts by weight of Portland cement. All of the solids were finely divided prior to mixing and sufficient water was added to render an extrudable plastic mass. This mass was then extruded into 1/8" diameter extrusions. These extrusions were dried for a short interval, were broken into short lengths and were calcined in air at 750° C. for 12 hours. Crush strength determinations were made upon the thus produced pellets both immediately after calcination and after use in a test reactor. In both cases the crush strength was about 22 pounds dead weight load. This is a relatively high crush strength for a catalyst of this kind. By comparison, the commonly used commercial catalyst when made up into 1/8" pellets may be readily crushed between the fingers. The pore volume of the internal surface area of the catalyst of this example was measured after extrusion but before calcination by the nitrogen absorption method and found to be in the range of 4 to 6 square meters per gram. After calcination, the surface area was found to be less than 4 square meters per gram. Thus it is apparent that admixture of the cement with iron oxide followed by extrusion is all that is required to reduce surface area.

The Portland cement utilized had the following analysis:

| | Percent by weight |
|---|---|
| CaO | 63.2 |
| $SiO_2$ | 21.3 |
| $Al_2O_3$ | 6.0 |
| $Fe_2O_3$ | 2.7 |
| MgO | 2.9 |
| $SO_3$ | 1.8 |

Since the $SO_3$ in the above analysis consists essentially of $SO_3$ added in the form of gypsum, the relative amount of calcium sulphate may be estimated.

A charge of this catalyst was placed in an isothermal reactor, and a feed gas consisting of about 80% normal butene and about 20% butane was conducted through the reactor from a preheater at a normal butene hourly space velocity of about 300. Steam was introduced into the preheater, the amount of steam being such that the ratio by volume of steam to feed gas was about 12 to 1. The pressure of the mixed feed gas and steam was maintained at about 6 pounds per square inch gauge and the temperature within the reactor was increased in 25° increments from 1100° to 1200° F. The effluent gas was analyzed periodically and from this analysis the conversion and yield at each temperature were calculated and plotted against temperature. The plotted points were used to establish a straight line and an integrated value of percent conversion was calculated. The following values were obtained:

Conversion value _____ Mol percent__ 25
Selectivity value _____ do____ 84.8
CSV _____ 109.8
Yield _____ 21.2

The average temperature during this run was 1150° F.

A comparative run was made using commercial catalyst (205) formed into ⅛″ diameter extrusions with all other operating conditions substantially identical. The results of this check run were as follows:

Conversion value_____ Mol percent__ 26.4
Selectivity value _____ do__ 78.8
CSV _____ 105.2
Yield _____ 20.8

The difference in yield does not appear to be very great, however when it is borne in mind that the feed stock is continuously recycled and the increase is cumulative with each pass, a slight numerical difference assumes considerable significance. It has been pointed out, for example, that a difference in selectivity of only one percent in the operation of a plant having a capacity of 100 tons of butadiene per day will result in an annual saving of about $45,000.00 based upon feed stock savings alone. Thus the six percent difference in selectivity reported above assumes considerable significance.

Because of the low physical strength of the conventional catalyst, a more practical comparison can be made by comparing results obtained with the catalyst of this Example 1 with a corresponding test run made with conventional catalyst in the form of ³⁄₁₆″ diameter extrusions. The relatively higher strength of the catalyst of this invention permits the use of the smaller ⅛″ diameter extrusions. In such a check run, made with ³⁄₁₆″ diameter conventional catalyst, and otherwise substantially identical conditions, the following results were obtained:

Conversion value _____ mol percent__ 25.6
Selectivity value _____ do____ 75.9
CSV _____ 101.5
Yield _____ 19.4

This is well below the comparable figure of 21.2 obtained with the catalyst of this Example 1.

Example 2

A catalyst was prepared by admixing 56.2 parts by weight of iron oxide, 26.3 parts by weight potassium carbonate, 2.5 parts by weight chromic oxide and 15.0 parts by weight Portland cement. Thirty parts by weight of water were utilized, and the resulting plastic mass was extruded into ⅛″ and ³⁄₁₆″ diameter extrusions. The iron oxide utilized had an acicular macro structure and was alpha ferric oxide of hexagonal crystalline form. It had a surface area of about 40 square meters per gram as determined by nitrogen absorption, and pore volume of 0.07 to 0.08 cubic centimeter per gram.

The extrusions were dried and allowed to cool, were broken into short lengths, and were calcined at 600° C. for 3 hours. Crush strength of the ⅛″ extrusions was tested and found to be about 20 pounds dead weight load. A charge of ⅛″ extrusions was placed in the isothermal reactor utilized in Example 1, and a gas stream admixed with steam and having the same composition as that of Example 1 was passed therethrough. The average temperature was maintained at 1170° F., and otherwise conditions of the test were identical to those of Example 1. The results of this test were as follows:

Conversion value _____ mol percent__ 28.0
Selectivity value _____ do____ 77.0
CSV _____ 105.0
Yield _____ 21.6

These figures represent a 20-day average obtained over an extended run. At the end of this extended run, the catalyst was regenerated and the test was resumed. Regeneration was affected by steaming the catalyst at a temperature of about 1100° F. Subsequent to regeneration the catalyst was again placed in use and the effluent stream was analyzed and it was found that the conversion value had risen to 29.8 mol percent and the selectivity value to 78.3 mol percent and, consequently, the CSV was 108.1 and the yield was 23.2.

Extrusions of the catalyst of this example which were ³⁄₁₆″ in diameter were prepared in the same manner as the ⅛″ extrusions, and in order to obtain comparative values they were tested in the isothermal reactor under identical conditions except that the average temperature was 1160° F. The following data were obtained:

Conversion value _____ mol percent__ 25.6
Selectivity value _____ do____ 75.9
CSV _____ 101.5
Yield _____ 19.4

Example 3

A catalyst was prepared by mixing 38.4 parts of iron oxide ($Fe_2O_3$), 38.5 parts by weight potassium carbonate ($K_2CO_3$), 2.5 parts by weight of chromic oxide ($Cr_2O_3$), and 26.6 parts by weight of Portland cement. These materials were mixed with about 30.0 parts by weight of water. The iron oxide was the same as that used in Example 2.

The plastic mass was extruded into ⅛″ extrusions, dried and allowed to cool and finally calcined at 600° C. Crush strength determinations were made on the extrusions, and they were found to be able to withstand 20 pounds dead weight load prior to the use of the catalyst, and after use of the catalyst the crush strength was found to have risen to 28.0 pounds dead weight load. This catalyst was charged into the test reactor described in Example 1 and the same feed gas stream admixed with steam was passed through the catalyst under conditions identical with those of Example 1, except that the temperature was 1172° F. The following results were obtained:

Conversion value _____ mol percent__ 23.7
Selectivity value _____ do____ 85.1
CSV _____ 108.8
Yield _____ 20.2

It should be noted that the iron oxide content of this catalyst was only 38.4% which is very low. Yet, the CSV and yield obtained were virtually identical with those obtained with conventional commercial catalyst formed into ⅛″ extrusions. The catalyst of this Example 3, however, because of the high proportion of potassium and because of the high content of Portland cement is far superior in its physical properties and its active life to the conventional catalyst.

Example 4

In order to determine whether the higher yield and CSV experienced with catalyst of this invention are due to a particular kind of cement employed as a binder, catalyst was prepared utilizing aluminous cement sold under the trade name "Lumnite." Except for the substitution of aluminous cement for Portland cement the catalyst of this example and the catalyst of Example 1 were identical. Moreover, these catalysts were tested in the isothermal reactor under identical conversion conditions. The results of these comparative tests are tabulated below:

| Values | Example 4 catalyst— Aluminous Cement | Example 1 catalyst— Portland Cement |
|---|---|---|
| Conversion value, mol percent | 25.0 | 25.0 |
| Selectivity value, mol percent | 75.2 | 84.8 |
| CSV | 100.2 | 109.8 |
| Yield | 18.8 | 21.2 |

The difference particularly in selectivity is striking as will be seen by inspection of the above table. The analysis of the aluminous cement utilized is as follows:

| | Percent by weight |
|---|---|
| CaO | 36.8 |
| SiO$_2$ | 9.6 |
| Al$_2$O$_3$ | 41.1 |
| Fe$_2$O$_3$ | 4.9 |
| MgO | 0.9 |
| SO$_3$ | 0.2 |
| FeO | 5.6 |

The relatively low total calcium content of this aluminous cement particularly as compared with the aluminum and silicon contents is believed to be responsible for the lowered catalytic properties of the catalyst of this example. It is not unreasonable to assume that available calcium developed upon setting and calcination of catalyst made with Portland cement exerts an activating effect upon the catalytic activity of the other ingredients in the catalyst of this invention, most probably by controlling the structure of the iron. X-ray diffraction studies of the catalyst of this example showed relatively large amounts of alpha iron oxide (Fe$_2$O$_3$).

*Example 5*

A catalyst was prepared from a Portland cement clinker in place of the Portland cement utilized in the catalyst of Example 1. In all other respects this catalyst and the catalyst of Example 1 were identical. The Portland cement clinker has substantially the same chemical analysis as Portland cement but does not contain gypsum (CaSO$_4$). The catalyst made with Portland cement clinker was tested under similar conversion conditions to the catalyst of Example 1. The temperature in this clinker catalyst test was 1175° F. The following results were obtained:

| Values | Catalyst Made From Clinker | Catalyst of Example 1— Portland Cement |
|---|---|---|
| Conversion value, mol percent | 25.1 | 25.0 |
| Selectivity value, mol percent | 82.9 | 84.8 |
| CSV | 108.0 | 109.8 |
| Yield | 20.8 | 21.2 |

It should be noted that both the yield and selectivity values are not as low as those obtained with aluminous cement (which analyzes very low in calcium) but are slightly lower than those obtained with the catalyst of Example 1 made with Portland cement. It is believed, therefore, that the enhanced catalytic effect may be due to calcium compounds which become available upon setting and subsequent calcination (or heating to reaction temperature) of the cement clinker rather than due solely to calcium oxide formed from the gypsum. X-ray studies of catalyst prepared according to the method of this invention and from either Portland cement or Portland cement clinker clearly show the presence of calcium iron oxide (CaO.Fe$_2$O$_3$ and 2Ca.O.Fe$_2$O$_3$). In contrast in the case of aluminous cement the available alumina combines with calcium oxide which might otherwise be liberated upon setting so that, in effect, no substantial quantity of unbound calcium compound is available.

In producing catalyst according to this invention there are certain ranges of proportions of ingredients which should be maintained for optimum results. The amount of cement should be between about 5% and about 30% by weight of the dry ingredients. The amount of iron oxide preferably should be at least about 30% and should not be greater in any event than about 80%. The amount of potassium is not so critical, if long life may be sacrificed or if potassium may conveniently be added from time to time during the use of the catalyst in the conventional manner. However, it is preferred to utilize between about 5% and about 40% potassium carbonate in the dry ingredient mixture. The amount of chromic oxide is preferably at least about 0.5% by weight of the dry ingredients and may be as high as 10%.

The iron oxide which is utilized is preferably a pigment grade, because such grades tend to be purer than naturally occurring materials and are finely ground for ready mixing with the other ingredients. The degree of oxidation and the particular phase of the iron oxide may be varied, but in general powdered or pigment grades of the following types are suitable:

Gamma—ferric oxide
Magnetite—(ferrosoferric oxide)
Alpha—ferric oxide

When in use under reaction conditions, however, it has been discovered that the iron oxide, if not already in that form, is converted largely to the magnetite form (Fe$_3$O$_4$).

If desired, other alkali metals may be utilized instead of potassium but for the reasons set forth in the introductory portion of the specification, it is preferred to use potassium carbonate. Other materials known to be promoters or stabilizers may be substituted for part of the ingredients and other changes and modifications such as will present themselves to those familiar with the art and may be made without departing from the spirit of this invention and the scope of which is commensurate with the following claims.

What is claimed is:

1. A catalyst suitable for the dehydrogenation of olefins in the presence of steam at temperatures above 550° C., consisting essentially of iron oxide, a minor amount of an alkaline compound of an alkali metal, a minor amount of chromium oxide, and between about 5% and 30% by weight of a hydraulic cement containing free calcium oxide which is not chemically bound with aluminum or silica compounds, said catalyst having an internal surface area less than 8 square meters per gram and being characterized by the presence of mangetite and calcium iron oxide upon X-ray diffraction analysis.

2. A catalyst as defined by claim 1 wherein the iron oxide is 30% to 80% of the catalyst weight, the alkaline compound of an alkali metal is 5% to 40% of the catalyst weight, the chromium oxide is 0.5% to 10% of the catalyst weight and the hydraulic cement is 5% to 30% of the catalyst weight.

3. A catalyst as defined by claim 2 wherein the hydraulic cement is Portland cement.

4. A catalyst as defined by claim 2 wherein the hydraulic cement is Portland cement clinker.

5. Method of producing a catalyst suitable for the dehydrogenation of olefins in the presence of steam at temperatures above 550° C., which comprises mixing together iron oxide having a surface area of at least about 30 square meters per gram, 5% to 30% (calculated on the weight of the finished catalyst) of hydraulic cement containing free calcium oxide which is not chemically bound with aluminum or silicon compounds, a minor amount of an alkaline compound of an alkali metal, a minor amount of chromium oxide and sufficient water to form an extrudable mass, and extruding said mass to form catalyst pellets having an internal surface area of less than about 8 square meters per gram.

6. The method of claim 5 wherein the iron oxide is 30% to 80% of the catalyst weight, the alkaline compound of an alkali metal is 5% to 40% of the catalyst weight, the chromium oxide is 0.5% to 10% of the catalyst weight and the hydraulic cement is 5% to 30% of the catalyst weight.

7. The method of claim 6 wherein the hydraulic cement is Portland cement.

8. The method of claim 6 wherein the hydraulic cement is Portland cement clinker.

9. Process of dehydrogenating a hydrocarbon of the class consisting of mono-olefins and alkylated aromatic hydrocarbons, which comprises contacting a mixture of said hydrocarbon and at least two volumes of steam per volume of hydrocarbon at a temperature in the range of 550° C. and 700° C. and a pressure near atmospheric, with a catalyst consisting esesntially of iron oxide, a minor amount of an alkaline compound of an alkali metal, a minor amount of chromium oxide, and between about 5% and 30% by weight of a hydraulic cement containing free calcium oxide which is not chemically bound with aluminum or silicon compounds, said catalyst having an internal surface area less than 8 square meters per gram and being characterized by the presence of magnetite and calcium iron oxide upon X-ray diffraction analysis.

10. Process as defined by claim 9 wherein the catalyst contains 30% to 80% by weight of iron oxide, 5% to 40% by weight of an alkaline compound of an alkali metal, 0.5% to 10% by weight of chromium oxide, and 5% to 30% by weight of hydraulic cement.

11. Process as defined by claim 10 wherein the hydraulic cement is Portland cement.

12. Process as defined by claim 10 wherein the hydraulic cement is Portland cement clinker.

References Cited in the file of this patent

UNITED STATES PATENTS

| | | |
|---|---|---|
| 2,386,499 | Owen | Oct. 9, 1945 |
| 2,665,259 | Buffett | Jan. 5, 1954 |
| 2,836,570 | Peers | May 27, 1958 |
| 2,891,956 | Oberlin et al. | June 23, 1959 |
| 2,897,160 | Fleming et al. | July 28, 1959 |

FOREIGN PATENTS

| | | |
|---|---|---|
| 424,478 | Great Britain | Feb. 21, 1935 |
| 667,876 | Great Britain | Mar. 12, 1952 |